(12) United States Patent
Rego et al.

(10) Patent No.: US 7,354,215 B2
(45) Date of Patent: Apr. 8, 2008

(54) DISPENSING PACKAGE FOR A COSMETIC/ANTIPERSPIRANT/DEODORANT OR OTHER STICK PRODUCT

(75) Inventors: John J. Rego, Mason, OH (US); Michael J. Roy, Belchertown, MA (US)

(73) Assignee: Rego & Roy, LLC, Mason, OH (US)

( * ) Notice: Subject to any disclaimer, the term of this patent is extended or adjusted under 35 U.S.C. 154(b) by 218 days.

(21) Appl. No.: 10/918,159

(22) Filed: Aug. 13, 2004

(65) Prior Publication Data

US 2005/0274746 A1 Dec. 15, 2005

Related U.S. Application Data

(60) Provisional application No. 60/575,768, filed on May 28, 2004.

(51) Int. Cl.
*B43K 5/06* (2006.01)
*B43K 23/00* (2006.01)
*B43K 21/08* (2006.01)
*B65D 39/00* (2006.01)

(52) U.S. Cl. .......................... 401/175; 401/98; 401/75; 215/256; 215/255; 215/254

(58) Field of Classification Search ................ 401/68, 401/75, 175, 174, 172, 98; 215/250, 253, 215/254, 255, 256; 222/390; 264/268, 279
See application file for complete search history.

(56) References Cited

U.S. PATENT DOCUMENTS

| 3,917,417 A | 11/1975 | Lang |
| 3,927,784 A * | 12/1975 | Cochrane ................... 215/256 |
| 4,369,158 A | 1/1983 | Woodruff et al. |
| 4,932,803 A | 6/1990 | Goldberger et al. |
| 5,753,212 A * | 5/1998 | Pescatore et al. ............. 424/65 |
| 6,419,412 B1 * | 7/2002 | Ostrowski et al. ............ 401/98 |
| 6,598,767 B2 | 7/2003 | Baines et al. |

* cited by examiner

*Primary Examiner*—David J. Walczak
(74) *Attorney, Agent, or Firm*—Taft Stettinius & Hollister LLP

(57) ABSTRACT

A dispensing package for a cosmetic/antiperspirant/deodorant or other stick product. The dispensing package can have a tear-away seal integrally molded with the applicator end of the package barrel. The tear-away seal, or a frangible bead forming part of the tear-away structure, can contain a tab for the user to grip when removing the tear-away seal to open the product. The dispensing package can be actuated by rotating a thumb-wheel held in place by two slots in opposing sides of the package barrel. The elevator component that ejects product from the dispensing package can be molded with an unthreaded, self-tapping hole that is tapped by insertion of the actuator spindle during assembly of the dispensing package.

33 Claims, 5 Drawing Sheets

DISPENSING PACKAGE FOR A COSMETIC/ANTIPERSPIRANT/DEODORANT OR OTHER STICK PRODUCT

CROSS-REFERENCE TO RELATED APPLICATIONS

This application claims the priority of provisional Application Ser. No. 60/575,768, which was filed on May 28, 2004.

BACKGROUND

This invention relates to a dispensing package for a cosmetic/antiperspirant/deodorant or other stick product.

SUMMARY

The present invention is directed to dispensing package for a cosmetic/antiperspirant/deodorant or other stick product (i.e., foods, adhesives, etc.); and more specifically, to such a dispensing package having novel components and assemblies that simplify the manufacturing process for the product and also reduce the overall expense of the dispensing package and the ensuing stick product.

Accordingly, it is a first aspect of the present invention to provide a dispensing package for a cosmetic/antiperspirant/deodorant or other stick product that includes: (a) a barrel component defining an interior chamber, having an applicator end and an open actuator end; (b) an elevator component adapted to move longitudinally within the interior chamber of the barrel component; and (c) a spindle component vertically secured within the barrel component and having a shaft extending from the actuator end into the interior chamber defined by the barrel component and coupled to the elevator component such that rotation of the spindle component causes the elevator component to move longitudinally within the interior chamber of the barrel component; (d) where the barrel component includes a tear-away seal molded integrally therewith at the applicator end. In a detailed embodiment, the tear-away seal encloses the applicator end of the barrel component.

In an alternate detailed embodiment of the first aspect of the present invention, the tear-away seal has a domed shape.

In an alternate detailed embodiment of the first aspect of the present invention, the spindle component includes a threaded shaft, and the elevator component is molded such that it contains an unthreaded hole for receiving, and being threaded by, the spindle component.

In an alternate detailed embodiment of the first aspect of the present invention, the tear-away seal includes a tab extending therefrom to facilitate gripping by a user so that the user can tear the tear-away seal from the barrel by gripping and pulling on the tab. In a more detailed embodiment, the applicator end of the barrel has a tear-away sealing bead integrally molded radially between the tear-away seal and an inner periphery of the applicator end of the barrel, and where the tear-away bead has the gripping tab extending therefrom.

In an alternate detailed embodiment of the first aspect of the present invention, the barrel component includes a pair of opposed, horizontal slots extending therethrough approximate the actuator end; and the spindle component includes a thumb-wheel positioned in the interior chamber approximate the actuator end; and two diametrically-opposed ends of the thumb-wheel are respectively seated within, and extend through, the opposed, horizontal slots in the barrel component, thereby securing the spindle component to the barrel component.

It is a second aspect of the present invention to provide a dispensing package for a cosmetic/antiperspirant/deodorant or other stick product that includes: (a) a barrel component defining an interior chamber, having an applicator end and an open actuator end; (b) an elevator component adapted to move longitudinally within the interior chamber of the barrel component; and (c) a spindle component vertically secured within the barrel component and having a shaft extending from the actuator end into the interior chamber defined by the barrel component and coupled to the elevator component such that rotation of the spindle component causes the elevator component to move longitudinally within the interior chamber of the barrel component; (d) where the barrel component includes a pair of opposed, horizontal slots extending therethrough approximate the actuator end; and (e) where the spindle component includes a thumb-wheel positioned in the interior chamber approximate the actuator end; and (f) where two diametrically-opposed ends of the thumb-wheel are respectively seated within, and extend through, the opposed, horizontal slots in the barrel component, thereby securing the spindle component to the barrel component. This second aspect of the present invention may be practiced in any of the detailed embodiments set forth above for the first aspect.

It is a third aspect of the present invention to provide a dispensing package for a cosmetic/antiperspirant/deodorant or other stick product that consists essentially of the following components: (a) a barrel component defining an interior chamber, having an applicator end and an open actuator end, and a pair of opposed, horizontal slots extending therethrough approximate the actuator end; (b) an elevator component adapted to move longitudinally within the interior chamber of the barrel component; and (c) a spindle component vertically secured within the barrel component and having a shaft extending from the actuator end into the interior chamber defined by the barrel component and coupled to the elevator component such that rotation of the spindle component causes the elevator component to move longitudinally within the interior chamber of the barrel component; (d) where the spindle component includes a thumb-wheel positioned in the interior chamber approximate the actuator end; and (e) where two diametrically-opposed ends of the thumb-wheel are respectively seated within, and extend through, the opposed, horizontal slots in the barrel component, thereby securing the spindle component to the barrel component.

It is a fourth aspect of the present invention to provide a dispensing package for a cosmetic/antiperspirant/deodorant or other stick product that includes: (a) a barrel component defining an interior chamber, having an applicator end and an open actuator end; (b) an elevator component adapted to move longitudinally within the interior chamber of the barrel component; and (c) a spindle component vertically secured within the barrel component and having a shaft extending from the actuator end into the interior chamber defined by the barrel component and coupled to the elevator component such that rotation of the spindle component causes the elevator component to move longitudinally within the interior chamber of the barrel component; (d) where the spindle component includes a threaded shaft; and (e) where the elevator component is molded such that it contains an unthreaded hole for receiving, and being threaded by, the spindle component. This fourth aspect of the present invention may be practiced in any of the detailed embodiments set forth above for the first aspect.

It is a fifth aspect of the present invention to provide a dispensing package for a cosmetic/antiperspirant/deodorant or other stick product that includes: (a) a barrel component defining an interior chamber, having an applicator end and an open actuator end; (b) an elevator component adapted to move longitudinally within the interior chamber of the barrel component; and (c) a spindle component vertically secured within the barrel component and having a shaft extending from the actuator end into the interior chamber defined by the barrel component and coupled to the elevator component such that rotation of the spindle component causes the elevator component to move longitudinally within the interior chamber of the barrel component; (d) where the barrel component includes a tear-away product-shaping endwall molded integrally therewith at the applicator end. This fifth aspect of the present invention may be practiced in any of the detailed embodiments set forth above for the first aspect.

In an alternate detailed embodiment of the fifth aspect of the present invention, the tear-away product-shaping endwall seals the applicator end of the barrel component such that molten product can be filled into the barrel component through the open actuator end and contained in the barrel component by the tear-away product-shaping endwall.

DETAILED DESCRIPTION

The present invention is directed to dispensing package for a cosmetic/antiperspirant/deodorant or other stick product (i.e., foods, adhesives, etc.); and more specifically, to such a dispensing package having novel components and assemblies that simplify the manufacturing process for the product and also reduce the overall expense of the dispensing package and the ensuing stick product.

Figure 1:
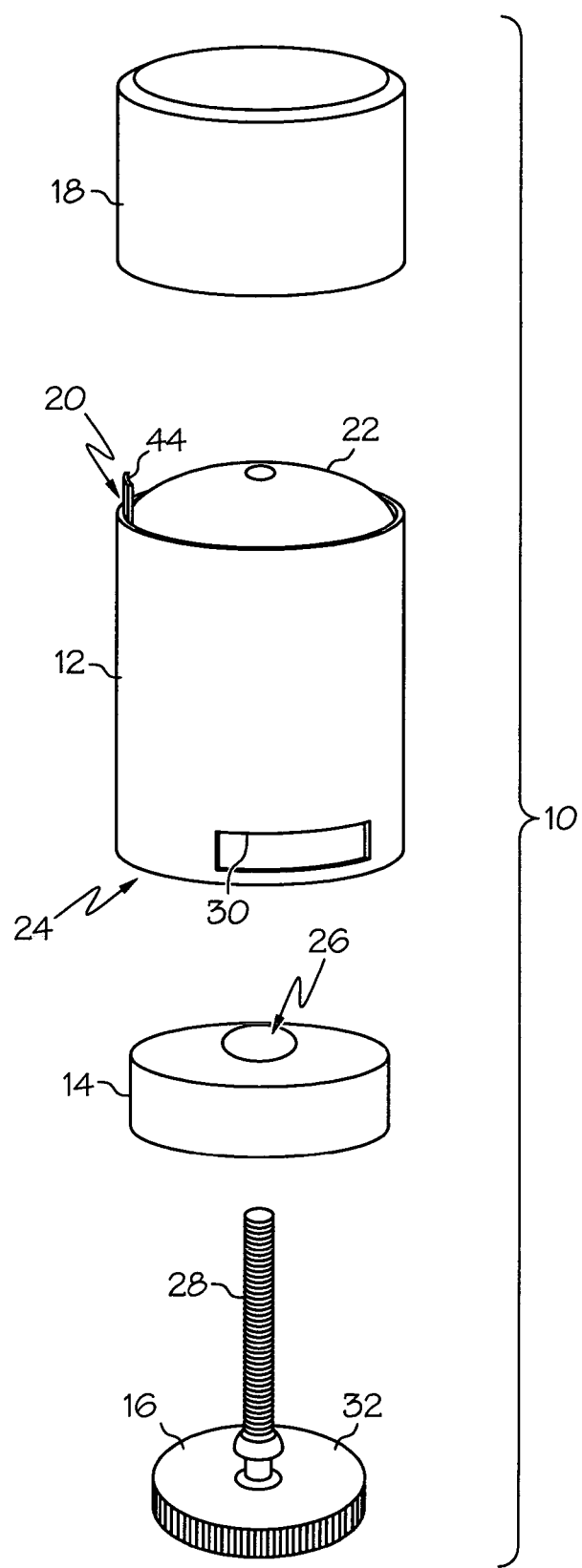
FIG. 1 shows an exploded view of an exemplary embodiment of the present invention.
Figure 2:
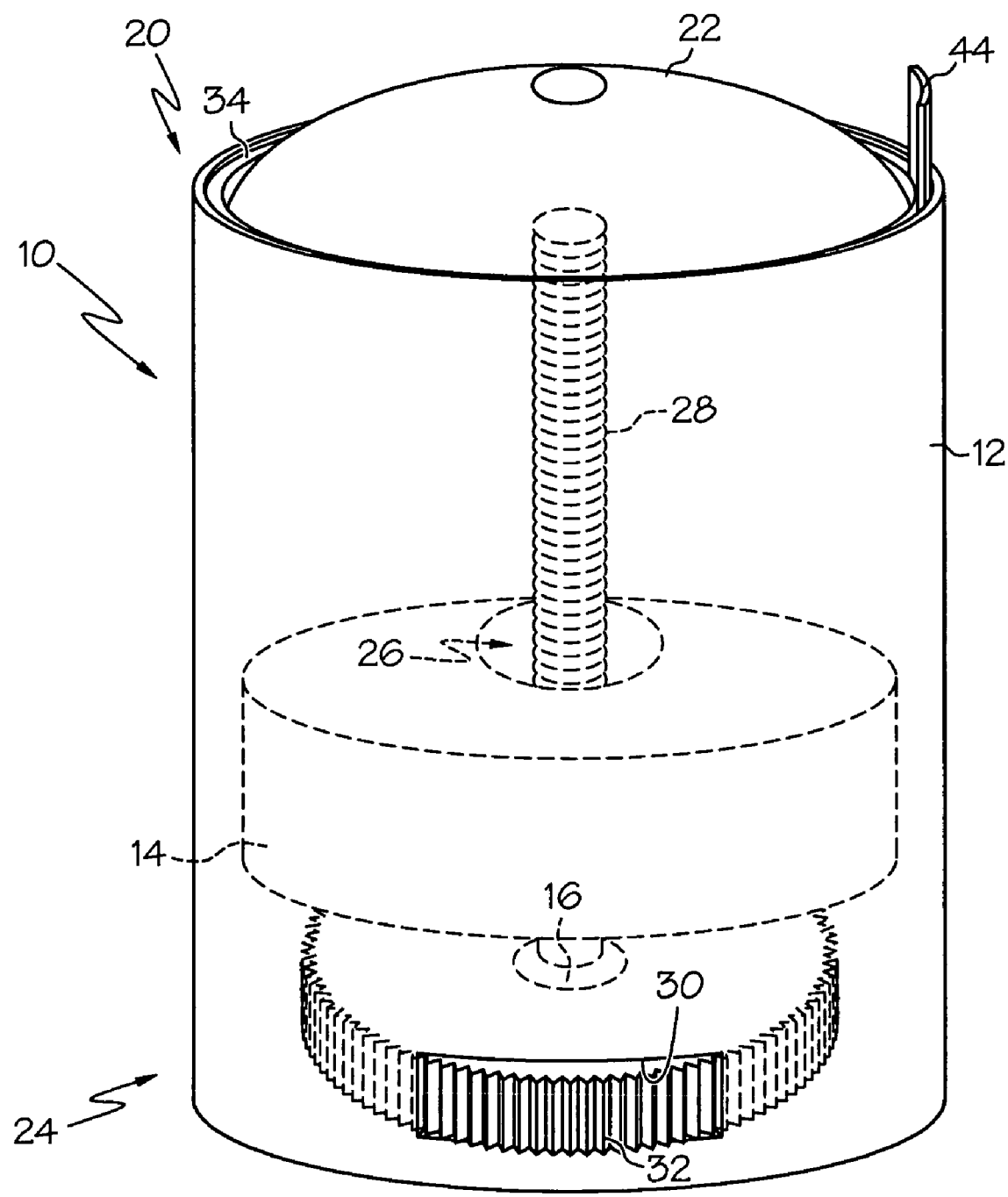
FIG. 2 shows a perspective view of an exemplary embodiment of the present invention as assembled, showing internal components in phantom lines.

As shown in FIGS. 1 and 2, a dispensing package 10 according to an exemplary embodiment of the present invention includes the following four injection molded plastic components: a barrel component 12, an elevator component 14, a spindle component 16 and an overcap component 18. The barrel component 12 is a hollow barrel defining an interior chamber having a substantially ellipsoidal cross-section. The applicator end 20 of the barrel has a domed seal 22 integrally molded thereon and the actuator end 24 is open. Referring primarily to FIG. 2, the elevator component 14 includes a center hole through which the threaded shaft 28 of the spindle 16 extends. Therefore, since the spindle component 16 is held vertically intact with respect to the barrel 12 when the dispensing package 10 is assembled (as will be discussed in detail below), rotation of the spindle 16 in a first direction will cause the elevator 14 to rise within the barrel and rotation in the opposite direction will cause the elevator to fall within the barrel.

The barrel 12 includes a pair of opposed horizontally extending slots 30 extending therethrough approximate the actuator end 24. These slots 30 seat and vertically maintain a thumb wheel 32 of the spindle 16 within the interior chamber of the barrel 12. Two diametrical ends of the thumb wheel 32 are respectively received within, and extend out through the opposed, horizontally extending slots 30 to thereby vertically secure the spindle 16 and elevator 14 (comprising an elevator assembly) within the barrel 12.

Figure 3:
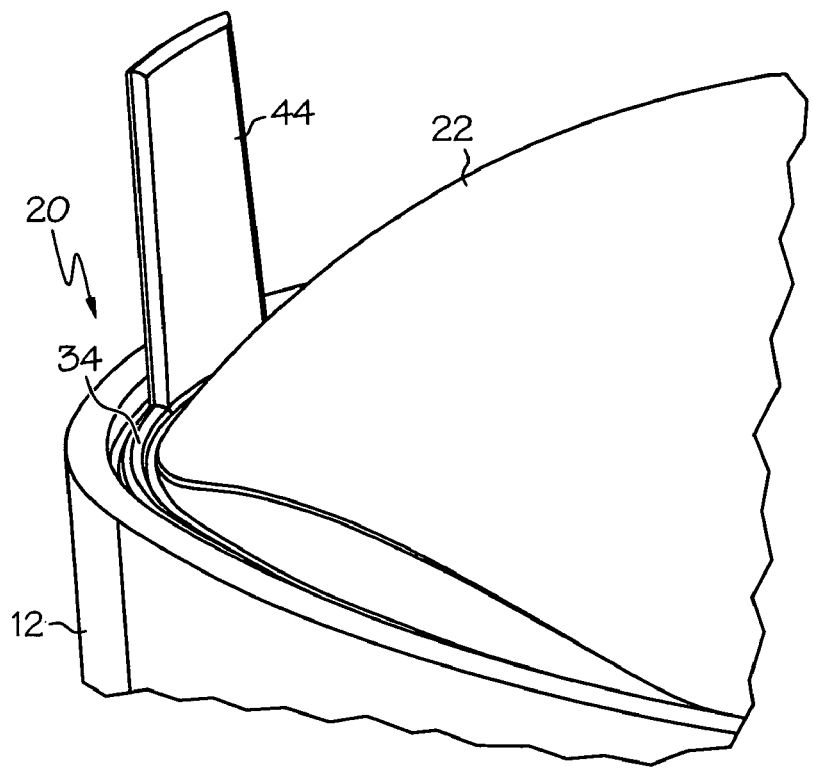
FIG. 3 shows a close-up view of the tear-away seal at the applicator end of the barrel, including the tear-away sealing bead and gripping tab, according to an exemplary embodiment of the present invention.
Figure 4:
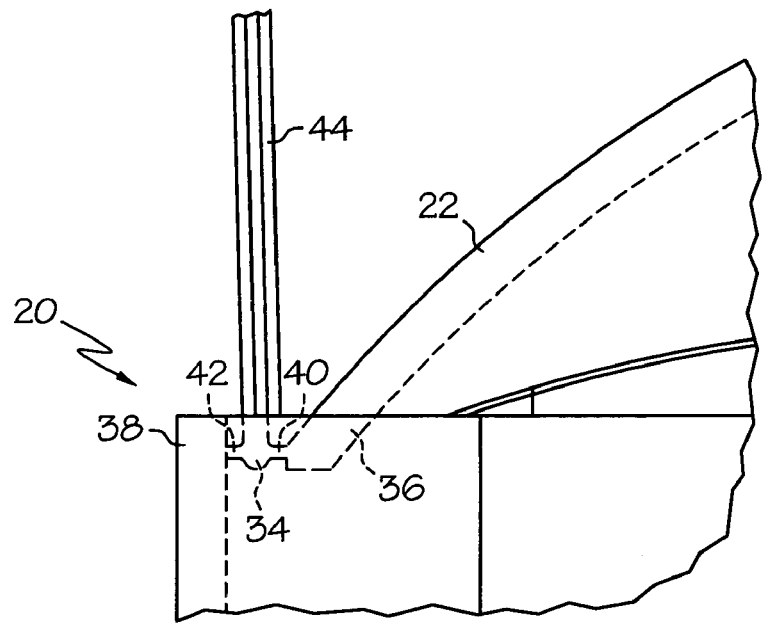
FIG. 4 shows a cross-sectional close-up view of the tear-away seal at the applicator end of the barrel, including the tear-away sealing bead and gripping tab, according to an exemplary embodiment of the present invention.

As introduced above, the barrel 12 includes a domed seal 22 integrally molded therewith at the applicator end 20. This seal 22, as will be described as follows, is adapted to be separated from or torn-away from the barrel 12 by the eventual user of the product to expose the cosmetic/antiperspirant/deodorant stick material emerging through the applicator end 20. Referring specifically to FIGS. 3 and 4, a tear-away sealing bead 34 is integrally molded peripherally around and radially between the base of 36 of the dome and the rim 38 at the applicator end 20 of the barrel 12. The bead 34 is radially bounded by a pair of thin frangible bridges 40, 42 integrally molded peripherally around and radially between the bead 34 and the base 36 of the dome and between the bead 34 and the rim 38 of the applicator end 20 of the barrel 12. A gripping tab 44 is integrally molded with the bead 34 and extends axially upward with respect to the bead so as to allow a user to grip and pull on the tab 44, which in turn causes the frangible bridges 40 and 42 to tear as the user pulls the bead 34 away from the package 10. Although not shown, there is a portion of the bridge 40 between the bead 34 and the base of the dome 36 that is substantially thicker (not readily able to be torn) such that as the user tears away the bead 34 peripherally around the base of the dome 36 and rim 38 of the barrel, when such tearing reaches this built-up section of the frangible bridge 40, further pulling on the tab 44 will cause the domed seal 22 to be pulled out from the applicator end 20 along with the remainder of the bead 34 (bridge 42 will be completely torn).

Figure 5:
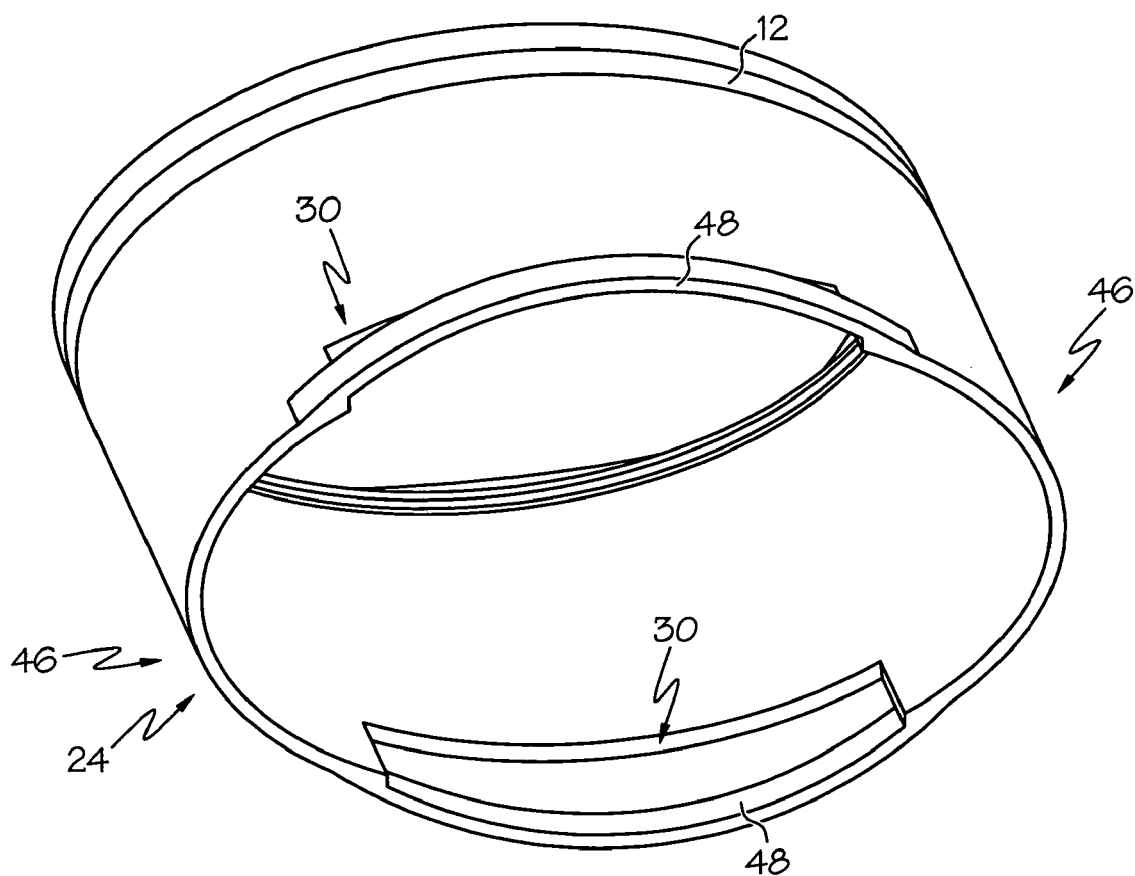
FIG. 5 shows a perspective bottom-end view of the applicator end of the barrel, according to an exemplary embodiment of the present invention.

FIG. 5 illustrates a perspective bottom-end view of the actuator end 24 of the barrel 12. As discussed above, the opposed horizontally-extending slots 30 seat and maintain the thumb wheel 32 of the spindle 16 therein, thereby securing the spindle 16 and elevator 14 within the interior chamber of the barrel 12 upon assembly. To assemble this dispensing package in this manner, the barrel 12 is first molded (i.e., injection molded) from a suitably flexible plastic/resin (such as polypropylene or polyethylene). Once molded, the barrel is set upside-down in a puck or a tray, for example, and molten or fluid cosmetic/antiperspirant/deodorant or other stick product material is deposited into the interior chamber of the barrel 12 through the open actuator end 24 (bottom end) of the barrel. Subsequently thereafter, and while the cosmetic/antiperspirant/deodorant or other stick product material is still substantially in a fluid state, the ends 46 of the longer diameter of the ellipsoid barrel are compressed in towards one another such that the actuator end 24 of the barrel 12 begins to take on a substantially circular shape. When the actuator end 24 of the barrel reaches the circular shape approximating the circular shape of the thumb wheel 32, the spindle 16 and elevator 14 are inserted through the actuator end 24 of the barrel until the thumb wheel 32 passes the lower horizontal strips 48 of the barrel between the window 30 and the edge of the barrel. At this point the threaded shaft 28 of the spindle 16 is fully submerged into the cosmetic/antiperspirant/deodorant or other stick product material and the upper surface of the elevator abuts against, or is very close to the cosmetic/antiperspirant/deodorant or other stick product material. Once the thumb wheel passes these lower strips 48, the pressure is removed from the diametric ends 46 to allow the actuator end of the barrel 12 to return to its substantially ellipsoidal shape in securing the thumb wheel 32 within the windows 30. At this point the cosmetic/antiperspirant/deodorant or other stick product material is substantially sealed between the lower surface of the domed seal 22 and the upper surface of the elevator, after which it substantially solidifies to its 'stick' state.

Figure 6:
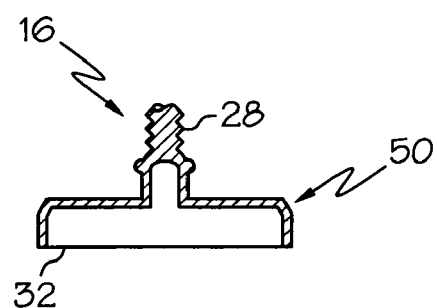
FIG. 6 shows a cross-sectional view of the thumb-wheel having a chamfered leading edge, according to an exemplary embodiment of the present invention.

Referring to FIG. 6, in the exemplary embodiment, the thumb wheel 32 has a chamfered leading edge 50, which helps facilitate passing the leading edge of the thumb wheel 32 by the lower strips 48 of the barrel and in to the horizontal slots 30. It can also be seen that the horizontal strips 48 are also slightly radially bowed out as compared to the remainder of the barrel walls to further facilitate this assembly step. Upon application of pressure on the diametric ends 46 of the barrel, this expanded diameter of the strips 48 will accommodate the thumb wheel passing thereby, but the smaller diameter of the walls of the barrel above the slots 30 will act as stops preventing further insertion of the thumb wheel thereby.

Figure 8:
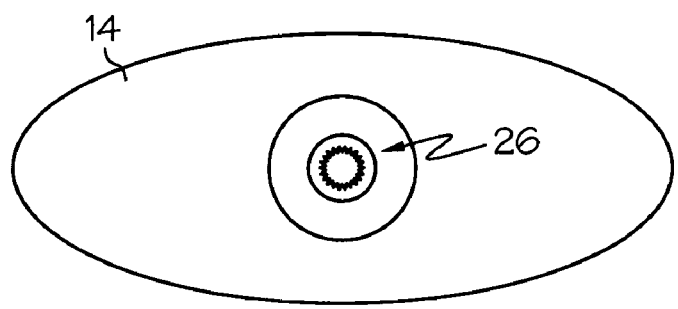
FIG. 8 shows a bottom view of a self-tapping hole in the elevator component, according to an exemplary embodiment of the present invention.
Figure 9:
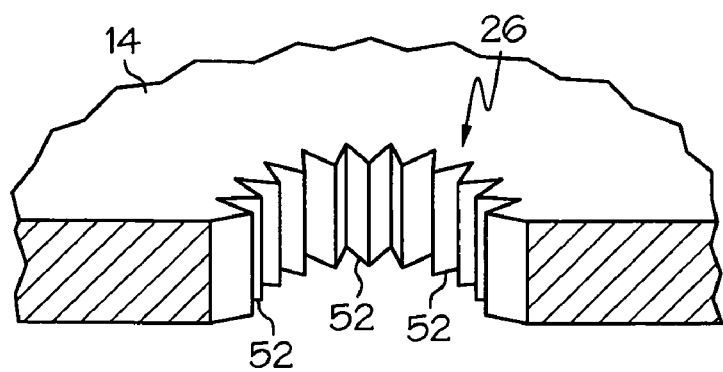
FIG. 9 shows a cutaway view of a self-tapping hole in the elevator component, according to an exemplary embodiment of the present invention.

Referring to FIGS. 8 and 9, it is within the scope of the invention that the hole 26 in the elevator 14 through which the threaded shaft 28 of the spindle 16 extends is a self-tapping hole. Specifically, as shown in FIGS. 8 and 9, when molded, the hole 26 in the elevator 14 will include a straight draw set of splines 52 that are very easy to mold and to remove from the injection mold (i.e., no unscrewing action is required). The first time the threaded shaft 28 is threaded into the hole 26, the threaded shaft 28 cuts threads into the splines 52 as it is assembled at high speed; and thus, the spindle 16 would act like a self-tapping wood/metal screw.

Figure 7:
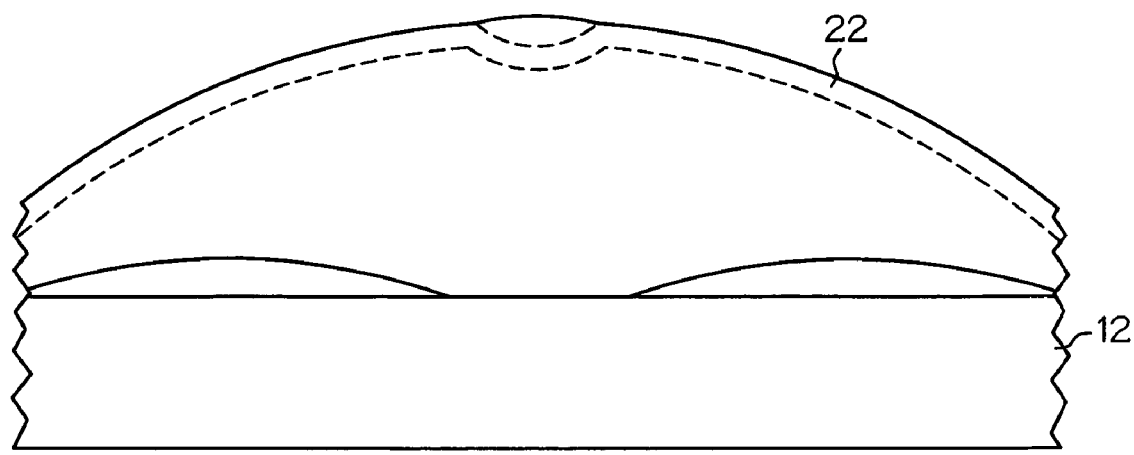
FIG. 7 shows a cross-sectional close-up view of the tear-away seal at the applicator end of the barrel according to an exemplary embodiment of the present invention.

The exemplary embodiment of the barrel 12 is molded having thin side walls that vary from approximately 0.025 inches to approximately 0.015 inches. The seal design is also based upon optimizing the "thin wall" aspects of the barrel design. A transitional wall section will span the top flat or domed area of the seal to promote uniform flow of the plastic (polypropylene or polyethylene) that tracks the oval shape and allows for uniform filling of the side walls around the outside of the domed seal to the last point of fill. The over-cap design will incorporate stop positions ribs on the inside diameter or a stepped wall that creates a full perimeter stop position surface. The tear way seal design allows the mold for the barrel to be top center gated. (See FIG. 7). This gate design and the use of the integral domed seal with the rest of the body allows for a contoured and smooth top edge at the point of application while providing for a thin wall design to the lower portion of the body in the direction of the actuator end and its associated bottom fill opening.

The tear way seal allows for safe, secure and high-speed bottom filling and shaping of the hot (un-solidified) cosmetics/antiperspirant/deodorant product into the pre-assembled body/cap unit of the dispensing package, alone, or with the use of a carrier tray. The integral seal and bead have substantial capabilities to maintain a substantially 100% hermetic seal in volatile environments to minimize weight loss prior to initial use.

The four-component design as discussed above also substantially reduces the number of molded components as compared to prior art stick delivery products. For example, the present invention eliminates a separate securing platform of the elevator assembly and also eliminates a separate product shaping seal. The present invention likewise eliminates a number of assembly steps.

As an alternative to the filling step described above, it is within the scope of the invention that the dispensing package is assembled first with the elevator assembly discussed above; and, thereafter, the molten cosmetic/antiperspirant/deodorant or other stick product material is injected into the interior chamber of the barrel 12 through the open actuator end 24 (bottom end) of the barrel and through injection holes (not shown) in the elevator such that the molten cosmetic/antiperspirant/deodorant or other stick product fills the area between the elevator 14 and the domed seal 22.

Having described the invention with reference to exemplary embodiments, it is to be understood that the invention is defined by the claims and it not intended that any limitations or elements describing the exemplary embodiment set forth herein are to be incorporated into the meanings of the claims unless such limitations or elements are explicitly listed in the claims. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. A dispensing package for a cosmetic, antiperspirant, deodorant, or other stick product, comprising:
    a barrel component defining an interior chamber, having an applicator end and an open actuator end;
    an elevator component adapted to move longitudinally within the interior chamber of the barrel component; and
    a spindle component vertically oriented within the barrel component and having a longitudinal tap extending from the actuator end into the interior chamber defined by the barrel component and coupled to the elevator component such that rotation of the spindle component causes the elevator component to move longitudinally within the interior chamber of the barrel component;
    wherein the barrel component includes a tear-away seal molded integrally therewith at the applicator end, the tear-away seal including a tear-away sealing bead comprising a generally horizontal flange circumferentially inset within the barrel component.

2. The dispensing package of claim 1, further comprising:
    a cap component removably mounted on the applicator end of the barrel component.

3. The dispensing package of claim 1, wherein the tear-away seal encloses the applicator end of the barrel component.

4. The dispensing package of claim 3, wherein the tear-away seal has a domed shape.

5. The dispensing package of claim 3, wherein the tear-away seal includes a tab extending therefrom to facilitate gripping by a user so that the user can tear the tear-away seal from the barrel by gripping and pulling on the tab.

6. The dispensing package of claim 5, wherein the tear-away seal has a domed shape.

7. The dispensing package of claim 3, wherein the tear-away sealing bead is integrally molded radially between the tear-away seal and an inner periphery of the applicator end of the barrel component.

8. The dispensing package of claim 7, wherein the tear-away seal has a domed shape.

9. The dispensing package of claim 7, wherein the tear-away sealing bead includes a tab extending therefrom to facilitate gripping by a user so that the user can tear the tear-away seal and the tear-away sealing bead from the barrel by gripping and pulling on the tab.

10. The dispensing package of claim 9, wherein the tear-away seal has a domed shape.

11. The dispensing package of claim 1, wherein the barrel component includes a pair of opposed, horizontal slots extending therethrough approximate the actuator end; and
wherein the spindle component includes a thumb-wheel positioned in the interior chamber approximate the actuator end; and
wherein two diametrically-opposed ends of the thumb-wheel are respectively seated within, and extend through, the opposed, horizontal slots in the barrel component, thereby securing the spindle component to the barrel component.

12. The dispensing package of claim 11, wherein the thumb-wheel has a chamfered leading edge to help facilitate insertion of the diametrically-opposed ends of the thumb-wheel through the opposed, horizontal slots in the barrel component.

13. The dispensing package of claim 11, wherein the tear-away seal encloses the applicator end of the barrel component.

14. The dispensing package of claim 13, wherein the tear-away seal has a domed shape.

15. The dispensing package of claim 13, wherein the thumb-wheel has a chamfered leading edge to help facilitate insertion of the diametrically-opposed ends of the thumb-wheel through the opposed, horizontal slots in the barrel component.

16. The dispensing package of claim 13, wherein the tear-away seal includes a tab extending therefrom to facilitate gripping by a user so that the user can tear the tear-away seal from the barrel by gripping and pulling on the tab.

17. The dispensing package of claim 16, wherein the tear-away seal has a domed shape.

18. The dispensing package of claim 16, wherein the thumb-wheel has a chamfered leading edge to help facilitate insertion of the diametrically-opposed ends of the thumb-wheel through the opposed, horizontal slots in the barrel component.

19. The dispensing package of claim 13, wherein the tear-away sealing bead is integrally molded radially between the tear-away seal and an inner periphery of the applicator end of the barrel component.

20. The dispensing package of claim 19, wherein the tear-away seal has a domed shape.

21. The dispensing package of claim 19, wherein the thumb-wheel has a chamfered leading edge to help facilitate insertion of the diametrically-opposed ends of the thumb-wheel through the opposed, horizontal slots in the barrel component.

22. The dispensing package of claim 19, wherein the tear-away sealing bead includes a tab extending therefrom to facilitate gripping by a user so that the user can tear the tear-away seal and the tear-away sealing bead from the barrel by gripping and pulling on the tab.

23. The dispensing package of claim 22, wherein the tear-away seal has a domed shape.

24. The dispensing package of claim 22, wherein the thumb-wheel has a chamfered leading edge to help facilitate insertion of the diametrically-opposed ends of the thumb-wheel through the opposed, horizontal slots in the barrel component.

25. A dispensing package for a cosmetic, antiperspirant, deodorant, or other stick product, comprising:
a barrel component defining an interior chamber, having an applicator end and an open actuator end;
an elevator component adapted to move longitudinally within the interior chamber of the barrel component; and
a spindle component vertically oriented within the barrel component and having a shaft extending from the actuator end into the interior chamber defined by the barrel component and coupled to the elevator component such that rotation of the spindle component causes the elevator component to move longitudinally within the interior chamber of the barrel component;
wherein the barrel component includes a tear-away product-shaping endwall molded integrally therewith at the applicator end, the tear-away product shaping endwall including a tear-away sealing bead comprising a generally horizontal flange circumferentially inset within the barrel component.

26. The dispensing package of claim 25, further comprising:
a cap component removably mounted on the applicator end of the barrel component.

27. The dispensing package of claim 25, wherein the spindle component includes a threaded shaft; and
wherein the elevator component is molded such that it contains an unthreaded hole for receiving, and being threaded by, the spindle component.

28. The dispensing package of claim 25, wherein the tear-away product-shaping endwall encloses the applicator end of the barrel component.

29. The dispensing package of claim 25, wherein the tear-away product-shaping endwall has a domed shape.

30. The dispensing package of claim 25, wherein the tear-away product-shaping endwall includes a tab extending therefrom to facilitate gripping by a user so that the user can tear the tear-away product-shaping endwall from the barrel by gripping and pulling on the tab.

31. The dispensing package of claim 25, wherein the tear-away sealing bead is integrally molded radially between the tear-away product-shaping endwall and an inner periphery of the applicator end of the barrel component.

32. The dispensing package of claim 31, wherein the tear-away sealing bead includes a tab extending therefrom to facilitate gripping by a user so that the user can tear the tear-away product-shaping endwall and the tear-away sealing bead from the barrel by gripping and pulling on the tab.

33. The dispensing package of claim 25, wherein the tear-away product-shaping endwall seals the applicator end of the barrel component such that molten product can be filled into the barrel component through the open actuator end and contained in the barrel component by the tear-away product-shaping endwall.

* * * * *